United States Patent
Boyd (10) Patent No.: US 6,993,013 B1
(45) Date of Patent: Jan. 31, 2006

(54) METHOD AND APPARATUS FOR PROACTIVE ANALYSIS OF SIGNALING MESSAGES EXCHANGED BETWEEN A CALL PROCESSING TELECOMMUNICATIONS SYSTEM AND VOICE-OVER-INTERNET PROTOCOL DEVICES

(75) Inventor: Malcolm Boyd, Overland Park, KS (US)

(73) Assignee: Sprint Communications Company L.P., Overland Park, KS (US)

( * ) Notice: Subject to any disclaimer, the term of this patent is extended or adjusted under 35 U.S.C. 154(b) by 807 days.

(21) Appl. No.: 09/966,168

(22) Filed: Sep. 28, 2001

(51) Int. Cl.
*H04L 12/66* (2006.01)

(52) U.S. Cl. ...................... 370/352; 370/496

(58) Field of Classification Search ........ 370/352–356, 370/401, 465, 466, 485, 487, 496, 493; 379/10.03, 379/15.01, 15.03, 201.02, 221.12
See application file for complete search history.

(56) References Cited

U.S. PATENT DOCUMENTS

| | | | |
|---|---|---|---|
| 6,687,251 B1 * | 2/2004 | Mousseau et al. | 370/401 |
| 6,748,433 B1 * | 6/2004 | Yaakov | 709/224 |
| 6,754,224 B1 * | 6/2004 | Murphy | 370/432 |
| 2002/0141386 A1 * | 10/2002 | Minert et al. | 370/352 |
| 2004/0008824 A1 * | 1/2004 | Resuta | 379/27.02 |

* cited by examiner

*Primary Examiner*—Chau Nguyen
*Assistant Examiner*—Soon D. Hyun (57) ABSTRACT

A telecommunications network includes a switch configured for handling a VOIP call and a monitoring system, coupled to the switch, for identifying service deficiencies for a customer originating the VOIP call. In connection with the VOIP call, the switch handles a series of signaling messages. By sequentially examining the signaling messages handled by the switch after the messages are merged into a single, chronologically ordered file, the monitoring system identifies service deficiencies for the customer, thereby enabling initiation of proactive remedial action to address the identified service deficiencies. Service deficiencies are identified based upon an examination of one or more signaling messages. Warning messages generated to identify the service deficiencies may have customer information appended thereto, thereby enhancing the ability of the service provider to proactively initiate remedial action prior to receipt of a complaint from the affected customer.

19 Claims, 9 Drawing Sheets

METHOD AND APPARATUS FOR PROACTIVE ANALYSIS OF SIGNALING MESSAGES EXCHANGED BETWEEN A CALL PROCESSING TELECOMMUNICATIONS SYSTEM AND VOICE-OVER-INTERNET PROTOCOL DEVICES

CROSS-REFERENCE TO RELATED APPLICATIONS

Not applicable.

STATEMENT REGARDING FEDERALLY SPONSORED RESEARCH OR DEVELOPMENT

Not applicable.

REFERENCE TO A MICROFICHE APPENDIX

Not applicable.

LIST OF ABBREVIATIONS

The following abbreviations are use within this specification:
ATM Asynchronous Transfer Mode
CP Call Processor
CRCX Create Connection
DLCX Delete Connection
IAD Integrated Access Device
IETF Internet Engineering Task Force
IP Internet Protocol
MDCX Modify Connection
MEGACO/H.248 Media Gateway Control (Ref: IETF RFC 3015; ITU Rec. H.248)
MGCP Media Gateway Control Protocol (Ref: IETF RFC 2705)
NTFY Notify
PC Personal Computer
POTS Plain Old Telephone Service
PSTN Public Switched Telephone Network
RFC Request For Comment
RQNT Notification Request
SGCP Simple Gateway Control Protocol (IETF Internet Draft)
SS7 Signaling System 7
VOIP Voice-Over-Internet Protocol

FIELD OF THE INVENTION

The invention is directed to a method and apparatus for proactive analysis of signaling messages exchanged between a call processing telecommunications system and "voice-over-internet protocol" (VOIP) devices. By chronologically examining signaling messages exchanged between call processing functionality within a service node and "Internet Access Devices" (IADs) served thereby, losses or degradations in service may be identified and appropriate remedial measures initiated proactively.

BACKGROUND OF THE INVENTION

The "Plain Old Telephone Service" (POTS) network was designed for voice calls only and transmission speed was limited to the rate calculated by Nyquist. A circuit is allocated for a telephone conversation regardless of whether all the 64,000 bits per second of bandwidth are being used or not. There became a need for more efficient use of bandwidth and greater transmission speeds. There has been a massive move to update transmission on telephone networks to use "fiber optic" technology and to find more bandwidth efficient ways of transmitting data. Modern VOIP technologies address the needs of efficiently making telephone calls over modern networks and the existing POTS network. Examples of these protocol technologies are "Simple Gateway Control Protocol" (SGCP), "Media Gateway Control Protocol" (MGCP), Megaco/H.248 and H.323.

The widening array of transport media available for voice and other types of communications has led to a proliferation of service providers. As a result, the quality and reliability of service is an important factor in distinguishing one service provider over another. Traditionally, service providers have addressed losses or other degradations in service on a reactive basis. For example, if a customer is having problems obtaining a dial tone when going off-hook, the service provider would wait for the customer to complain before dispatching a service technician to address the problem. However, even if the problem is fixed quickly and efficiently, the loss of service often leaves a more lasting impression than the prompt restoration thereof.

Unfortunately, the service provider has few tools in support of proactive remedial action which can be initiated before the customer complains about a deficiency in service. Accordingly, this invention exploits signaling message protocols used when customers make telephone calls controlled by a VOIP signaling protocol to provide such a tool.

SUMMARY OF THE INVENTION

In one embodiment thereof, the present invention is directed to a telecommunications network which includes a switch configured for handling a VOIP call between an IAD and another IAD or an IAD and a Voice Gateway and a monitoring system, coupled to the switch, for identifying service deficiencies for a customer by examining, in chronological order, a series of signaling messages handled by the switch in connection with the VOIP call. In one aspect thereof, the switch includes a plurality of call processors and a corresponding plurality of signaling message files. Each call processor handles selected ones of the series of signaling messages while the corresponding file maintains a record of the signaling messages handled by that call processor.

In another aspect of this embodiment of the invention, the monitoring system further includes first and second software modules tools. The first software tool merges the signaling messages maintained in the plurality of signaling message files and places the merged signaling messages into a sorted signaling message file of such that the merged signaling messages are arranged in chronological order. The second software module examines, in sequence, each one of the signaling messages maintained in the sorted signaling message file and determines, based upon one or more of the examined signaling messages, if a warning or error message should be generated. In still another aspect thereof, the service node further includes a warning/error message file in which the second software module places warning or error messages constructed thereby. In this aspect, the second software module constructs the warning or error messages using information contained in the examined signaling messages based upon which the second software module determined that the warning or error message should be generated. In still yet another aspect thereof, the service node further includes a customer information and warning/error message files coupled to the second software tool. In this aspect, the second software module constructs warning or error messages using information contained in the examined signaling messages upon which the second software tool determined that said warning or error message should be generated and information in said customer information file related to a VOIP customer.

Finally, in various other aspects of this embodiment of the invention, warning messages are generated upon the second software tool determining, among others, that: excessive time has elapsed between generation of a signaling message requiring an acknowledgement and receipt of that acknowledgement; excessive time has elapsed between a customer going off-hook and receiving dial tone; or excessive packet loss has occurred during the connection between the two parties involved in the VOIP Call.

In another embodiment, the present invention is directed to a method for proactively monitoring VOIP Telephone Calls. In accordance with the method of this embodiment of the invention, a data file describing customers served by a service provider is established. A set of signaling messages related to a VOIP call are examined to identify a service deficiency for a customer. Upon identifying a service deficiency, a warning message containing information regarding the identified service deficiency obtained from the set of signaling messages and information from the data file describing the customer is generated. Upon reviewing the generated warning message, a service technician employed by the service provider proactively initiates corrective action to rectify the identified service deficiency for the customer.

In accordance with one aspect of this embodiment of the invention, the set of signaling messages related to the VOIP call are arranged in chronological order. In another, further, aspect of this embodiment, a first call processor operated by the service provider handles a first portion of the set of control messages related to the VOIP calls and a second call processor operated by the service provider handles a second portion of the set of control messages related to the VOIP calls. A third call processor operated by the service provider handles a third portion of the set of control messages related to the VOIP calls. In this aspect of the invention, the set of control messages are produced by chronologically merging the first and second and third portions thereof.

In a further aspect thereof, the set of signaling messages are sequentially examined in the arranged chronological order. Variously, examination of the set of signaling messages may involve determining if a time delay between the customer going off-hook and acquiring dial tone is excessive; identifying a first signaling message which requires an acknowledgement, subsequently identifying a second signaling message that contains the corresponding acknowledgement and determining if a time period separating the first and second signaling messages is acceptable; identifying a first signaling message which contains bearer path data from the first subscriber, subsequently identifying a second signaling message which contains bearer path data from the second subscriber and determining if the packet loss between the first and second subscribers is excessive; identifying a first signaling message which requires a reply and generating a warning message if a signaling message which contains the reply to the first signaling message is not identified in the set of signaling messages and identifying, from the first signaling message that the customer has gone off-hook and the signaling message that contains the reply which was not in the set of messages would have indicated that the customer had received dial tone.

DETAILED DESCRIPTION OF THE INVENTION

Figure 1:
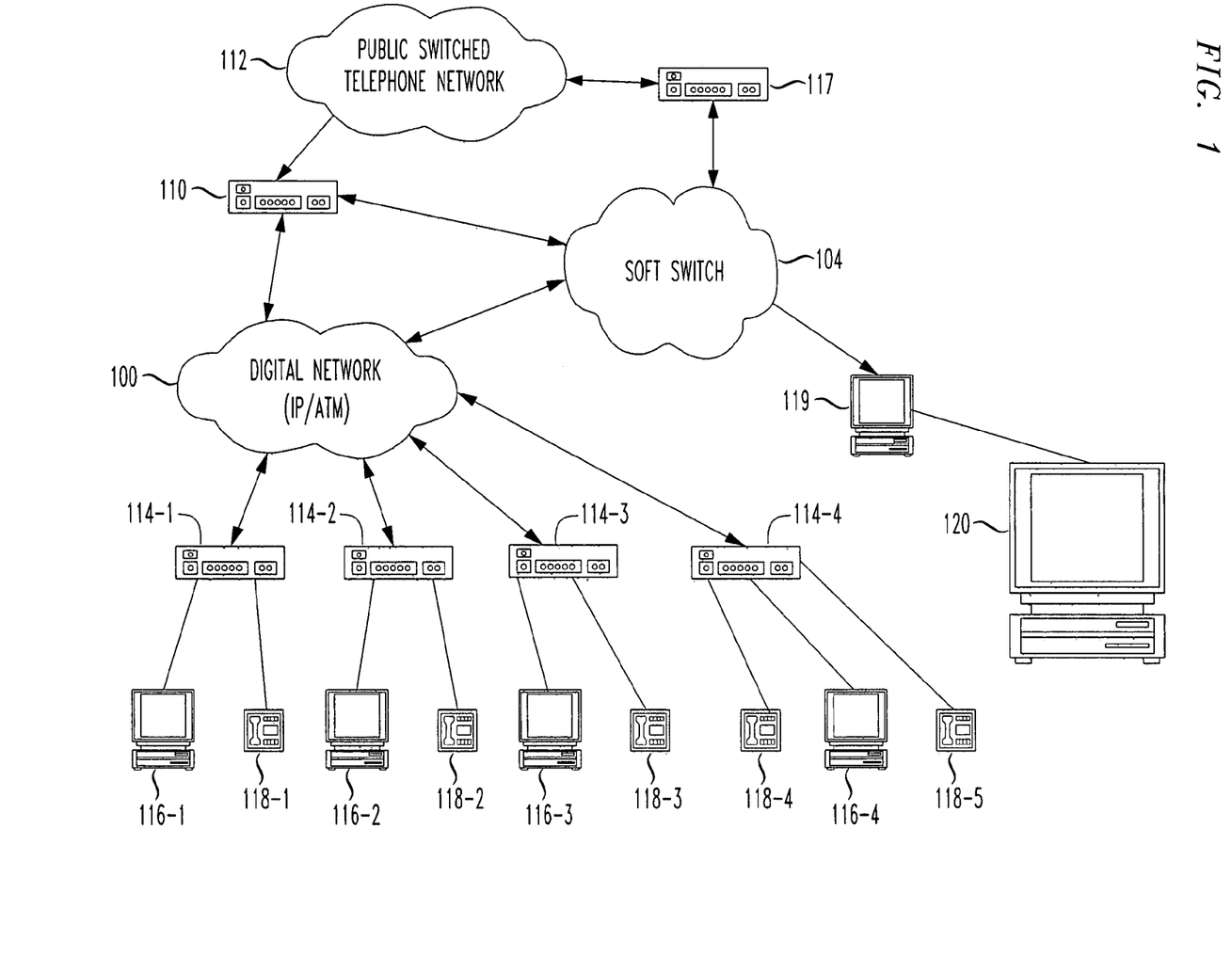
FIG. 1 is a block diagram of a VOIP telecommunications network

Referring now to FIG. 1, a digital network 100, for example, an "Internet Protocol/Asynchronous Transfer Mode" (IP/ATM) network, suitable for high speed transfer of voice, data and video information may now be seen. Customers are coupled to the digital network 100 by "Integrated Access Devices" (IADs) 114-1 through 114-4. As used herein, the terms "couple" or "coupled" refer broadly to either direct or indirect connection there between. An IAD is a device which enables plural digital devices, for example, a "personal computer" (PC) 116-1 and a telephone 118-1 coupled to the IAD 114-1, a PC 116-2 and a telephone 118-2 coupled to the IAD 114-2, a PC 116-3 and a telephone 118-3 coupled the IAD 114-3 and a PC 118-4, a telephone 118-4 and a telephone 118-5 coupled to the IAD 114-4, to exchange messages with the digital network 100 through a shared connection.

One characteristic of IADs is that the number of devices supported thereby may be varied. For example, in contrast to the single PC 116-1 and the single telephone 118-1 supported by the IAD-1, the IAD 114-4 supports a PC 116-4 and a pair of telephones 118-4 and 118-5. It should be clearly understood, however, that the number of PCs and telephones coupled to a particular IAD is purely exemplary and that various combinations of PCs and telephones may be coupled to an IAD. A number of the commercially available IADs are, however, configured to handle a single PC 116 and up to four telephones 118. Of course, the IADs 114-1 through 114-4 are merely used to simply enable plural devices to exchange messages with the digital network 100 over a single line. Accordingly, it is fully contemplated that a PC 116 or a telephone 118 may be coupled to the digital network 100 for the exchange of messages therewith without the use of an IAD 114 and may instead be directly coupled to the digital network 100 or indirectly coupled to the digital network 100 switch via another type of access device not shown in FIG. 1. Finally, it should be noted that, while FIG. 1 shows only PCs 116 and telephones 118 as being coupled to the digital network via the IADs 114-1 through 114-4, it is fully contemplated that a wide variety of electronic devices configured to transmit and/or receive digital messages may be coupled to the switch 104, either directly, via one of the IADs 114-1 through 114-4, or via another type of access device.

For the digital network 100, a voice gateway 110 controls access of voice data to and from "Public Switched Telephone Network" (PSTN) 112. Signaling messages for the voice data, on the other hand, are directed to soft switch 104 which, as may be seen in FIG. 1, is also coupled to the voice gateway 110 and to the PSTN 112 through "signaling system 7" (SS7) gateway 117. Coupled to the soft switch 104 is a sort protocol messages system 119. In turn, a Proactive VOIP Analysis System 120 is coupled to the sort protocol messages system 119. As will be more fully described below, the proactive VOIP analysis system 120 (hereafter referenced as the "Proactive Analysis System 120") reviews signaling messages exchanged between call processors residing within the switch 104 and endpoints for connections established by the call processors. The endpoints for these connections may be the IADs 114-1 or 114-2 (if one or both of the originating and/or destination telephones 118-1 through 118-5) or the Voice Gateway 110 (if the originating or destination subscriber is located on the PSTN 112). The signaling messages may conform to any suitable protocol which enables the transfer of digitally encoded voice data. For example, in the embodiment of the invention disclosed herein, the signaling messages conform to the SGCP protocol. Alternately, the control messages may conform to MGCP, H.248, or another suitable protocol.

Based upon a review of the signaling messages, the proactive analysis system 120 determines whether to generate one or more warning and/or error messages. The warning and/or error messages generated by the proactive analysis system 120 may variously be comprised of selected information contained in the reviewed signaling message or messages upon which the decision to generate a warning or error message was based, information locating the subject signaling messages within a sorted protocol message file, customer information maintained in a customer information file or various combinations of these types of information. The proactive analysis system 120 delivers the generated warning and/or error messages to a warning/error message file to await subsequent review by a service technician to proactively identify deficiencies in service and initiate appropriate corrective action before the subscriber issues a complaint regarding the deficiency. The ability of a telecommunications service provider to proactively correct service deficiencies represents a dramatic departure from prior practices in which corrective actions tended to be reactive, i.e., in response to a complaint by the subscriber. If desired, the proactive analysis system 120 may also generate a notification containing a summary of the warnings and/or error messages placed in the warning/error message file and deliver the notification to the service technician, thereby prompting the service technician to review the contents of the warning/error message file if a review of the delivered notification indicates that a review of the warning/error message file is appropriate.

The service technician may monitor the warning or error messages generated by the proactive analysis system 120 using a variety of techniques. For example, in FIG. 1, the proactive analysis system 120 resides in a computer system coupled to the soft switch 104 via a second computer system in which the sort protocol messages system 119 resides. The sort protocol messages system 119 and the proactive analysis system 120 are operated by the service provider operating the soft switch 104 to which it is attached. Periodically, signaling messages are downloaded to sort protocol messages system 119. The sort protocol messages system 119 constructs a sorted protocol messages file 140 which, in turn, is downloaded to the proactive analysis system 120. The proactive analysis system 120 analyzes the downloaded signaling messages in a manner to be more fully described below and, if appropriate, generates one or more warnings and/or error messages for placement in a data file. Subsequently, a service technician employed by the service provider reviews the warnings and error messages generated and maintained by the proactive analysis system 120. Alternately, the proactive analysis system 120 may be configured to transmit all warnings and/or error messages generated thereby to the service technician, for example, by periodically constructing an E-mail which contains all generated warnings and/or error messages and transmitting the constructed E-mail to the service technician. In another alternate configuration, the warning and/or error messages are placed in the data file. The proactive analysis system 120 then constructs a summary of the warnings and/or error messages placed in the data file and delivers the summary to the service technician, again, for example, using an E-mail message.

Alternately, it is contemplated that the sort protocol messages system 119 and the proactive analysis system 120 may form a part of the soft switch 104 itself. In this configuration, the proactive analysis system 120 would again generate a series of one or more warnings or error messages and maintain the generated warnings or error messages in a data file for later access by a service technician. Here, however, the service technician would typically access information maintained by the proactive analysis system 120 using a conventional web browser such as Microsoft Internet Explorer, Netscape Navigator or other access means.

Figure 2:
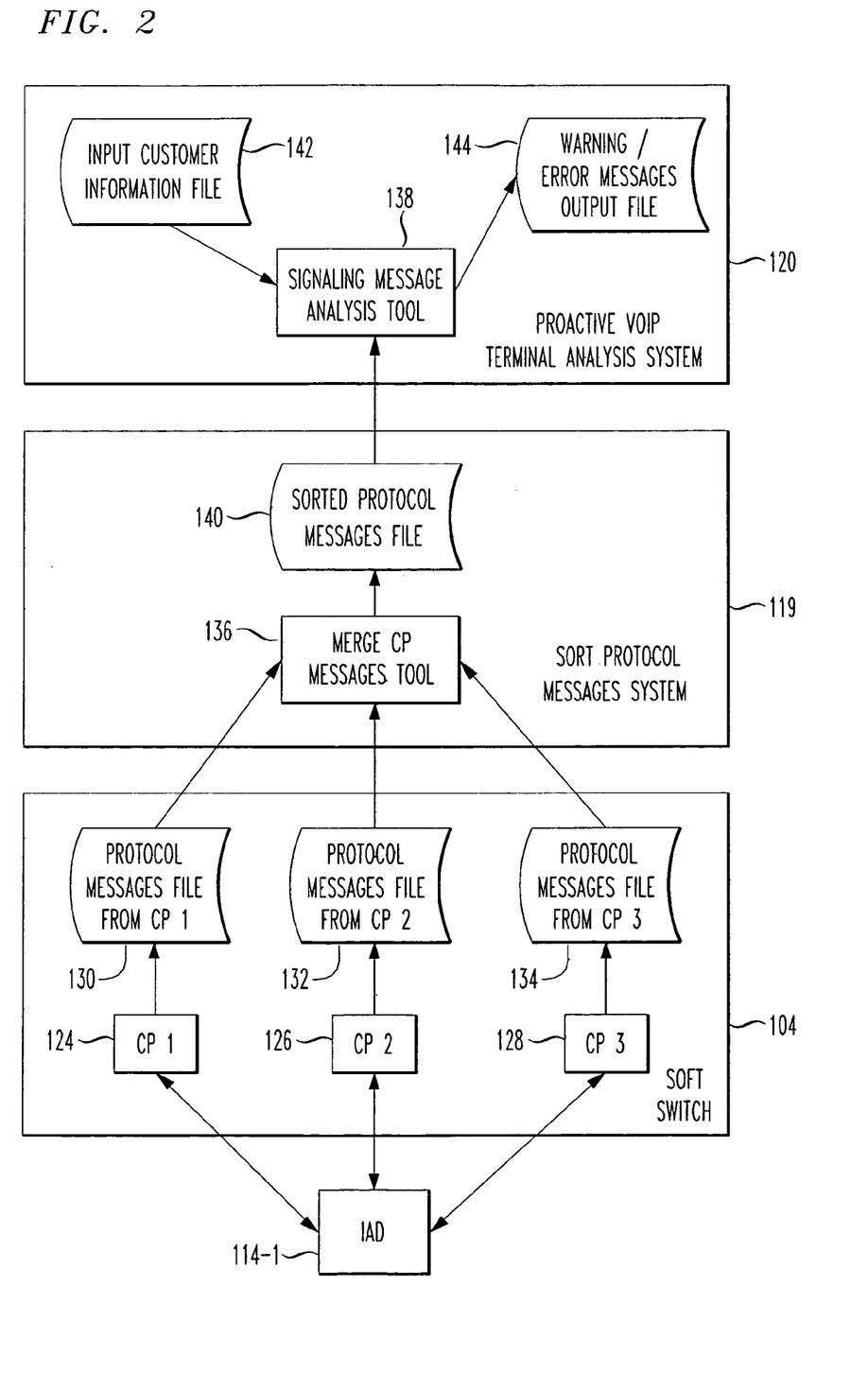
FIG. 2 is an expanded block diagram of a soft switch, a sort protocol messages system and a proactive Telephone analysis system of the telecommunications network of FIG. 1.

Referring next to FIG. 2, the configuration of the soft switch 104, the sort protocol messages system 119 and the proactive analysis system 120 will now be described in greater detail. As may now be seen, first, second and third "call processors" (CPs) 124, 126 and 128 reside on a processor subsystem (not shown) of the switch 104. Each of the CPs 124, 126 and 128 are coupled to a corresponding protocol message file 130, 132 and 134, respectively, which resides on a memory subsystem (also not shown) of the switch 104. The CPs 124, 126 and 128 are configured to control the transfer of voice and data by endpoints such as the IADs 114-1 and 114-2 when telephone calls are initiated by the telephones coupled to the IADs 114-1 and 114-2. The switch 104 also includes a load balancer (not shown) which monitors the number of exchanges being handled by each one of the CPs 124, 126 and 128 and will direct incoming signaling messages to selected ones of the CPs 124, 126 and 128 such that the loads thereof are balanced with respect to one another.

A signaling message being handled by the switch 104, for example, an incoming signaling message originated by the IAD 114-1, is directed by the load balancer to a selected one of the CPs 124, 126 or 128 for handling. In addition, the CP handling the received signaling message stores the message as an entry in the protocol message file associated therewith. The signaling messages are stored in a chronological order based upon the date/time that the messages were handled by the CP. Thus, the first protocol message file 130 contains a log of the signaling messages handled by the first CP 124, the second protocol message file 132 contains a log of the signaling messages received by the second CP 126 and the third protocol message file 134 contains a log of the signaling messages received by the third CP 128.

As may be further seen in FIG. 2, the sort protocol messages system 119 includes a first tool 136, more specifically, a merge CP messages tool 136, while the proactive VOIP proactive analysis system 120 includes a second tool 138, more specifically, a signaling message analysis tool 138, respectively. Each of these tools are software tools comprised of a set of instructions encoded in a memory subsystem (not shown) of the sort protocol messages system 119 and the proactive analysis system 120, respectively, and executable by a processor subsystem (also not shown) of the sort protocol messages system 119 and the proactive analysis system 120, respectively. The first software tool 136 includes a sorting algorithm which enables the tool to sort plural entries based upon a series of comparisons of a parameter, for example, date/time, common to all of the entries, thereby enabling the proactive analysis system 120 to generate the sorted protocol message directory 140 from the contents of the first, second and third protocol message directories 130, 132 and 134. The second software tool 138 includes a search engine for identifying entries in the sorted protocol message file 140 containing specified alphanumeric character strings and a math tool for performing mathematical operations using data from the entries in the sorted protocol message file 140. The proactive monitoring system 120 further includes first, second and third data stores 140, 142 and 144, more specifically, a sorted protocol message file 140, a customer information file 142 and a warning/error message file 144. Each of the first, second and third data files 140, 142 and 144 may be stored in a discrete physical memory device (not shown) forming part of the proactive analysis system 120 or, as disclosed herein, may be located at respective areas of a shared memory (also not shown).

Figure 3:
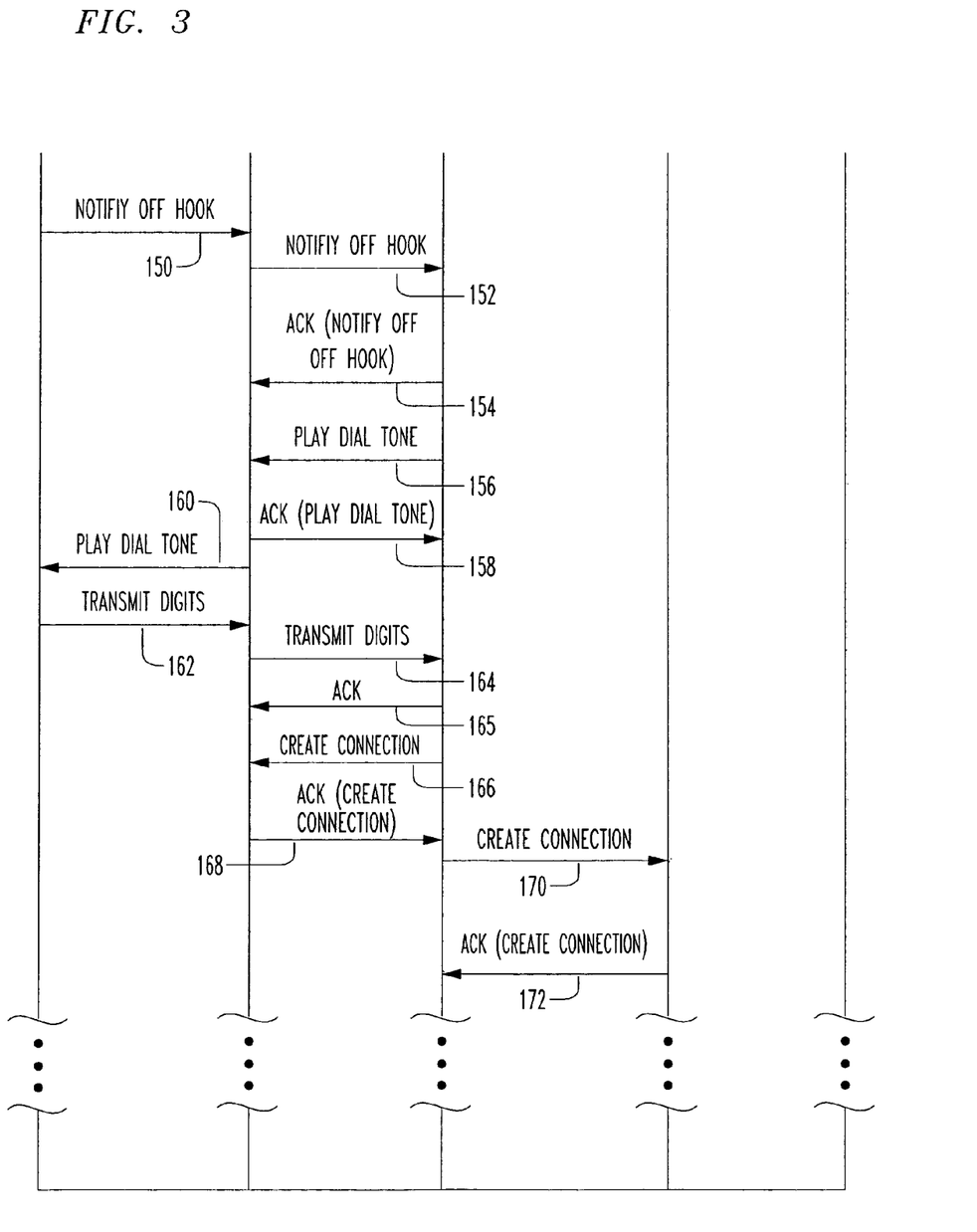
FIG. 3 is a flow diagram of signaling messages exchanged during a selected portion of a VOIP Call using the SGCP protocol

Prior to discussing the method of proactively analyzing Telephones in accordance with the teachings of the present invention, a portion of a typical SGCP protocol command message exchange performed by the first CP 124 while establishing an exchange of digital voice data between the Telephone 118-1 and the Telephone 118-2 will now be described in greater detail. As illustrated in FIG. 3, a call is initiated by a customer operating the Telephone 118-1 going "off-hook", typically, by lifting the handset of the Telephone 118-1. By lifting the handset, a "notify off-hook" indication is transmitted to the IAD 114-1 at step 150. In turn, the IAD 114-1 issues a "notify off-hook" command message to the first CP 124 at step 152. At step 154, the first CP 124 returns an acknowledgement to the IAD 114-1 and, at step 156, issues a "play dial tone" command message to the IAD 114-1. At step 158, the IAD 114-1 acknowledges the "play dial tone" command message issued by the first CP 124 and, at step 160, the IAD 114-1 issues a "play dial tone" instruction to the Telephone 118-1 being operated by the customer.

Proceeding on to step 162, in response to the audible detection of a dial tone, the customer will transmit a series of digits to the IAD 114-1, typically by depressing a sequence of keys on a keypad of the Telephone 118-1. In turn, the IAD 114-1 transmits the received digits to the first CP 124 at step 164. The first CP 124 ACKs the receipt of the transmitted digits at step 165 and then establishes a connection with the IAD 114-1 at step 166 by issuing a "Create Connection" command message. In turn, the Create Connection command message is acknowledged by the IAD 114-1 at step 168. The first CP 124 then establishes a connection with the IAD 114-2 at step 170 by issuing a Create Connection command message to the IAD 114-2 at step 170. The Create Connection command message is acknowledged by the IAD-2 at step 172. A number of additional steps follow, of course, but, as various ones of the conditions for which event messages are generated in accordance with the teachings of the present invention may be understood from the illustrated portion of a call, the remaining steps by which the Telephones 118-1 and 118-2 complete the call and the IAD 114-1, the first CP 124 and the IAD 114-2 clean up the call have not be described.

A first condition under which the proactive analysis system 120 will issue an warning relates to a failure of a CP or gateway to timely "acknowledge" (ACK) a signaling message which requires acknowledgement. All VOIP protocol messages require timely acknowledgements. Examples of these messages for the SGCP protocol are "Create Connection" (CRCX), "ModifyConnection" (MDCX), "DeleteConnection" (DLCX), "NotificationRequest" (RQNT) and "Notify" (NTFY). For example, at step 152, the IAD 114-1 issued an NTFY command message to the CP 124. If a pre-selected time period elapses before the CP 124 transmits an ACK("Notify Off-Hook") to the IAD 114-1 at step 154, the proactive analysis system 120 will generate a "Delayed Response" warning which is stored as an entry in the warning/error message file 144. The "Delayed Response" warning may, for example, be configured in the following manner:

```
warning Excessive latency detected**
NTFY Message from CP to IAD for transaction id 4930474
Trace File = newTRFiles/sortTr00044.txt
Measurement = 1 second, 87 Milliseconds and 253 Microseconds
```

The Delayed Response warning message is comprised of plural components, each containing useful information regarding the warning. Among them are components which describe the type of warning, its duration, the identity of the transaction for which the warning occurred and where, within the sorted protocol message directory 140, the entry describing the transaction is located.

Similarly, the proactive analysis system 120 will issue a warning if a CP or gateway never issues an ACK in response to a command message or if a command message which has never been received is ACK'd. For example, if the CP 124 never ACKs the notify NTFY command message issued by the IAD 114-1 at step 152, the proactive analysis system 120 will generate an "Unacknowledged Request" warning message which is stored as an entry in the warning/error message file 144. The "Unacknowledged Request" warning may, for example, be configured in the following manner:

```
warning No ACK found in traces**
NTFY message from CP to IAD for transaction id. 90
Trace File = newTrFiles/sortTr00001.txt
```

The Unacknowledged Request warning message is comprised of plural components, each containing useful information regarding the warning. Among them are components which describe the type of warning, the identity of the transaction for which the warning occurred and where, within the sorted protocol message directory 140, the entry describing the transaction is located.

The proactive analysis system 120 will also issue a warning message upon detection of various dial tone problems for a customer. For example, if the CP 124 fails to transmit a RQNT command message at step 156 to request that the IAD 114-1 play dial tone, the proactive analysis system 120 will generate a "No Dial Tone" warning message which is stored as an entry in the warning/error message file 144. The "No Dial Tone" warning message may, for example, be configured in the following manner:

```
warning customer smith, john did not get dial tone**
Reason - No Request for dial tone found from CP
For phone line 1 of IAD
Off hook is in file newTrFiles/sortTr00017.txt line no. 155
Date/Time = Wed Mar 14 15:31:48 2001 and 778079 micro secs
Transaction id. is 11875
The ACK to off hook is in file newTrFiles/sortTr00017.txt line no. 171
Date/Time = Wed Mar 14 15:31:48 2001 and 796349 micro secs
```

Here, the components of the warning message include components which describe the type of warning, the time at which the event which resulted in the warning occurred, the customer affected by the event, which of the customer's Telephones were affected by the event, the cause of the event, the transaction identity of the transaction for which the event occurred and where, within the merged control message directory 140, the entry describing the transaction is located.

Conversely, if an excessive amount time elapses between when the IAD 114-1 notifies the CP 124 at step 152 that the telephone 118-1 has gone off-hook by transmitting a NTFY command message and the IAD confirming receipt of the "play dial tone" command at step 158, the proactive monitoring system 120 will generate a "Delayed Dial Tone" warning message which is stored as an entry in the warning/error message file 144. The "Delayed Dial Tone" warning message may, for example, be configured in the following manner:

```
warning Excessive latency in getting dial tone for customer smith, john**
For phone line 1 of IAD
Off hook is in file newTrFiles/sortTr00034.txt line no. 340
Date/Time = Fri Jan 26 18:58:36 2001 and 708187 micro secs
Transaction id. is 15201
The ACK to Dial Tone Request is in file newTrFiles/sortTr00034.txt line no. 473
Date/Time = Fri Jan 26 18:58:45 2001 and 282734 micro secs
Customer got dial tone after 0 mins 8 secs 574547 micro secs after going off hook.
```

Here, the components of the warning message include components which describe the type of warning, the duration of the event which resulted in the warning, the subscriber affected by the event, which of the subscriber's Telephones were affected by the event, the cause of the event, the transaction identity of the transaction for which the event occurred and where, within the sorted protocol message directory 140, the entries describing the transaction are located.

Of course, it should be understood that there are a number of other conditions under which the proactive monitoring system 120 will generate either a warning or error message but which are not illustrated in FIG. 3. For example, when the first CP 124 transmits a DLCX signaling message to each of the IADs 114-1 and 114-2, the respective IADs will issue a reply message which contains bearer data such as the number of packets sent/number of packets lost for the subject connection. If an excessive number of data packets are lost, the proactive monitoring system 120 will generate a "Packet Loss" warning message which is stored as an entry in the warning/error message file 144. The "Packet Loss" warning message may, for example, be configured in the following manner:

\*\*\*Warning\*\*\*Bearer Path Problem Detected\*\*\*

```
*Severe Packet Loss Detected*
Only 90 percent of packets arrived at endpoint 118-2 that were sent from endpoint 118-1
Only 1998 of 2201 were received
Information read from trace is:
For Call Identifier 00000000000000000003175a7de4
For endpoint 118-2
Connection Id. 1e
The ACK for DLCX trans. Id. 13143380 reports 2201 packets sent and 4204 packets received
For endpoint 118-1 Connection Id. 947
Found in file newTrFiles/sortTr00003.txt
The ACK for DLCX trans. Id. 13732020 reports 4204 packets sent and 1998 packets received.
```

Here, the components of the warning message include components which describe the type of warning, the severity of the event which resulted in the warning, the Telephones and specific connection therebetween affected by the event, data related to the event from respective sides of the connection, the transaction identifier of the transactions providing data related to the event and the location within the sorted protocol message directory 140 of the entries containing the data related to the event.

Finally, if a response issued by an IAD reports an endpoint error, the proactive monitoring system 120 will issue an "Endpoint Error" error message which is stored as an entry in the warning/error message file 144. The "Endpoint Error" error message may, for example, be configured in the following manner:

```
error-Endpoint reported error
Error 512 is reported by endpoint on line 306 of file newTrFiles/sortTr00009.txt
```

Here, the components of the error message include components which describe the type of error and the location within the sorted protocol message directory 140 of the entry related to the error message.

Continuing to refer to FIG. 3, it should be noted that the exchange of signaling messages described therein presumed that the first CP 124 handles all of the signaling messages related to a call being established by the soft switch 104. However, one problem caused by the use of plural call processors and a load balancer is that various signaling messages may be handled by different ones of the plural call processors. For example, while the notify off-hook signaling message and acknowledgement may be handled by the first CP 124, the play dial signaling message and acknowledgement may be handled by the second CP 126. As a result, for a service technician to analyze a single connection with a telephone, for example, in response to a customer complaint regarding a problem in obtaining dial tone, the service technician would have to review plural protocol message files, specifically, the protocol message files 130, 132 and 134, to search for those command message entries related to the customer or connection being investigated. In contrast, various aspects of the present invention provide a sorted protocol message file 140 which contains all of the signaling message entries related to a connection and a warning/error message file 144 which contains entries directing the service technician to those signaling message entries contained in the sorted protocol message file 140 related to the warning and/or error messages contained in the warning/error message file 144.

Figure 4:
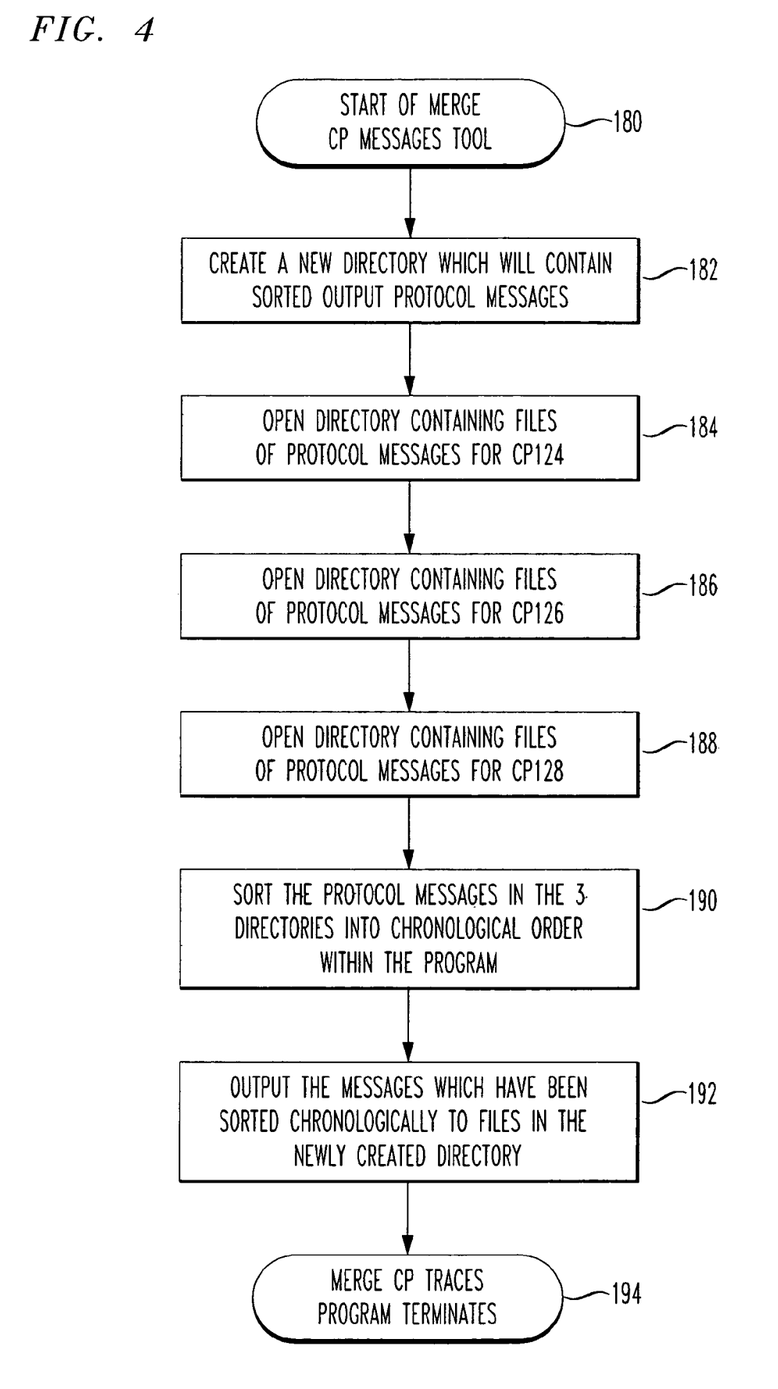
FIG. 4 is a flow chart of a method for chronologically merging signaling messages from plural protocol message files into a sorted protocol messaged file.

Referring next to FIG. 4, a method for generating the sorted protocol messages maintained in the sorted protocol message file 140 will now be described in greater detail. Prior to commencement of the method described herein, the call processors residing within a switch to which the method is to be applied are handling exchanges of signaling messages with IADs serviced by the switch, other switches within the network, or gateways to outside the network. For example, the CPs 124, 126 and 128 residing within the soft switch 104-1 would handle exchanges of VOIP signaling messages with the IADs 114-1 through 114-4 and the Voice Gateway 110. As the CPs 124, 126 and 128 handle the various signaling messages exchanged therewith, the protocol message file 130, 132 and 134 associated with that call processor maintains a copy of the signaling message as an entry therein. As will be more fully described below, each signaling message maintained as an entry in the protocol message files 130, 132 and 134 is comprised of plural components. A first (or "header") component of the entry will be comprised of an alphanumeric character string which identifies the type of request or response of the entry and a numeric character string used to correlate a request and a corresponding response. A second (or "session description") component of the entry may contain various types of information related to a transaction between first and second endpoints. Finally, a third component of the entry identifies the date and time at which the message was handled.

The signaling messages accumulate in the respective protocol message files 130, 132 and 134 until a pre-selected time period. When the pre-selected time period elapses, the method commences at step 180 with the start of the merge CP messages tool 136 within the sort protocol messages system 119. At step 182, the merge CP messages tool 136 creates the sorted protocol message file 140. Proceeding on to step 184, the merge CP messages tool 136 opens the protocol message file 130. Similarly, the merge CP messages tool 136 opens the protocol message file 132 at step 186 and the protocol message file 134 at step 188. The contents of the protocol message files 130, 132 and 134 are then downloaded into the merge CP messages tool 136 at step 190 where, within the merge CP messages tool 136, the messages downloaded from the protocol message files 130, 132 and 134 are chronologically sorted by date and time. Proceeding on to step 192, the sorted messages are output to the sorted protocol message file 140 where the contents of all three protocol message files 130, 132 and 134 are maintained in a single chronological order. The method then ends at step 194 with the termination of the merge CP messages program. Of course, when the pre-selected time period elapses again, the merge CP messages tool 136 will run the merge CP traces program again, thereby creating another sorted protocol message directory (not shown). Thus, over a period of time, it is contemplated that a series of sorted protocol message directories 140, each containing sorted messages from a respective time period, will reside on the proactive analysis system 120.

Figure 5A:
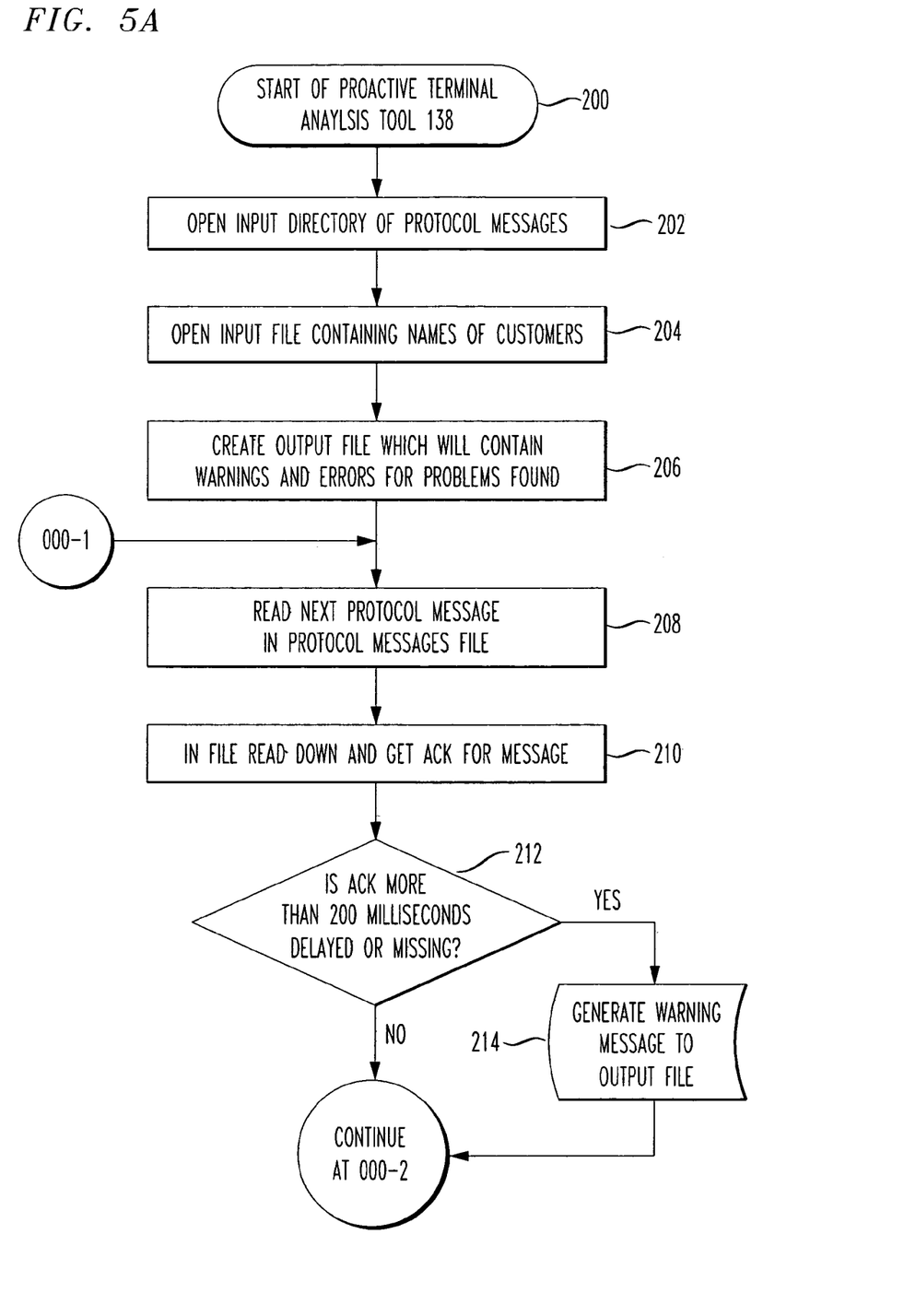
FIGS. 5a–c is a flow chart of a method for proactively analyzing protocol message files

Referring next to FIG. 5a, a method for generating warning and error messages suitable for use in connection with the proactive analysis of Telephone operation to identify deficiencies in service to customers will now be described in greater detail. The method commences at step 200 and at step 202, the signaling message analysis tool 138 within the proactive Telephone analysis system 120 opens the sorted protocol message file 140 containing the merged CP messages. At step 204, the signaling message analysis tool 138 opens the customer information file 142 containing the names of customers and, proceeding on to step 206, the signaling message analysis tool 138 creates the warning error message file 144 which will contain warnings and errors for problems identified during the examination of the sorted CP messages contained in the sorted protocol message directory 140 by the signaling message analysis tool 138.

As previously set forth, the signaling message analysis tool 138 contains a search engine which reviews the selected entry from the sorted protocol message file 140 for specified alphanumeric character strings. By identifying certain character strings within the entry, the specific control message described by the entry may be identified and useful information related to the identified control message derived. To appreciate how information is derived from entries maintained in the merged control message directory 140, an understanding of SGCP, the protocol used to exchange control messages is useful. Generally, the SGCP protocol is implemented as a set of transactions. Each transaction is composed of a request and a mandatory response. A request is composed of a request header, optionally followed by a session description. The request header has plural components. A first component of the request header is a four-letter upper or lower case ASCII code which identifies the type of request. A second component of the request header is a transaction identifier, encoded as a string of up to nine decimal digits, for correlating a request and a corresponding response. Conversely, the response header is composed of a response line, which is a three digit numeric value, followed by a white space, the transaction identifier, and an optional commentary, for example, "ok", in ASCII code.

Proceeding on to step 208, the signaling message analysis tool 138 will selects a first protocol message in the sorted protocol message file 140 as the next protocol message in the sorted protocol message file 140 to be examined. The signaling message analysis tool 138 reads the selected protocol message and, proceeding on to step 210, the signaling message analysis tool 138 begins to read down through the sorted protocol message file 140 for an acknowledgement to the protocol message. More specifically, the signaling message analysis tool 138 will search through the sorted protocol message file 140 for an entry headed by a three digit numeric value and a transaction identifier which matches the transaction identifier for the selected protocol message. Upon locating the acknowledgement to the selected protocol message, the method proceeds to step 212 where the signaling message analysis tool 138 determines if the latency is acceptable for the transaction being examined. To do so, the differential between the time of execution for the selected protocol message and the time of execution for the acknowledgement of the selected protocol message is calculated. If the time differential exceeds a pre-selected threshold value, for example, 200 milliseconds, then the signaling message analysis tool 138 determines that the transaction has excessive latency and the method would proceed to step 214 where a "Delayed Response" warning message is generated from the information set forth in the selected protocol message and the acknowledgement of the selected protocol message. The method would then proceed to step 216 for further processing. If, however, the signaling message analysis tool 138 determines at step 212 that the time differential has not exceeded the pre-selected threshold value, the method would immediately proceed to step 216 for further processing without generation of the delayed response warning message.

Figure 5B:
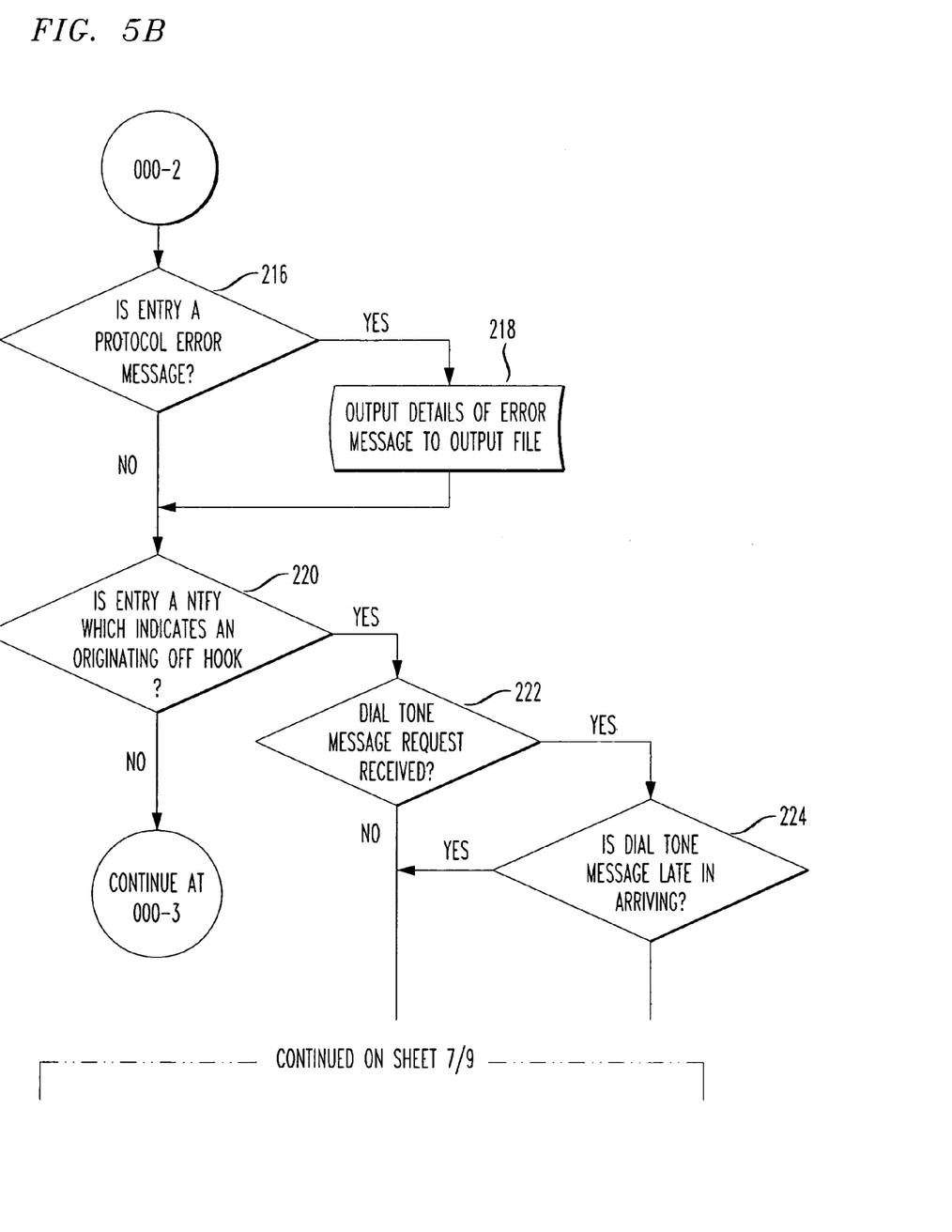

Referring next to FIG. 5b, at step 216, the signaling message analysis tool 138 determines if the response described in the acknowledgement of the selected protocol message identifies an endpoint error. If the numeric value of the header indicates that an endpoint error has occurred, the method proceeds to step 218 where an "Endpoint Error" error message is generated from the information contained in the selected protocol message and the acknowledgement. The method would then continue on to step 220 for further processing. If, however, the acknowledgement indicates that an endpoint error has not occurred, the method proceeds to step 220 for further processing without generation of the Endpoint Error error message.

At step 220, the signaling message analysis tool 138 examines the selected protocol message to determine if it is a NTFY message which indicates an originating off-hook. If examination of the selected protocol message indicates it is not such a message, the method proceeds to step 234 of FIG. 5c for further processing. If, however, examination of the selected protocol message indicates it is such a NTFY message, the method proceeds to step 222 where the signaling message analysis tool 138 determines if the request dial tone message was received. To do so, the signaling message analysis tool 138 read down through the sorted protocol message file 140 in a search for an entry containing a RQNT dial tone message directed to the same endpoint from which the NTRY message originated. If the signaling message analysis tool 138 cannot located a corresponding RQNT dial tone message, the signaling message analysis tool 138 determines that the request dial tone message was not received and the method will proceed to step 230 to being generation of a "No Dial Tone Received" warning in a manner more fully described below. If, however, the signaling message analysis tool 138 locates the corresponding RQNT message, the signaling message analysis tool 138 determines that the request dial tone message was received. The method will then proceed to step 224 for further processing.

At step 224, the method determines if the dial tone message was late in arriving. To do so, the signaling message analysis tool 138 compares the date and time appended to the NTFY message identified in step 220 to the date and time appended to the corresponding RQNT message identified in step 222. If the signaling message analysis tool 138 determines that the time differential between these signaling messages exceeds a pre-selected threshold value, for example, 2 seconds, the signaling message analysis tool 138 that the dial tone message was late in arriving. The method will then proceed to step 230 to begin generation of a "Delayed Dial Tone" warning in a manner to be more fully described below. If, however, the signaling message analysis tool 138 determines that the time differential between these signaling messages is at or below the pre-selected threshold value, the signaling message analysis tool 138 determines that the dial tone message was not late in arriving. The message will then proceed to step 226 for further processing.

At step 226, the signaling message analysis tool 138 determines if the request dial tone message identified at step 222 was acknowledged. To do so, the signaling message analysis tool 138 reads down through the sorted protocol message file 140 for an acknowledgement to the request dial tone message. More specifically, the signaling message analysis tool 138 will search through the sorted protocol message file 140 for an entry headed by a three digit numeric value and a transaction identifier which matches the transaction identifier for the request dial tone message. If an acknowledgement to the request dial tone message cannot be located within the sorted protocol message file 140, the method proceeds to step 230 to begin generation of a warning message at step 230 in a manner to be more fully described below. If, however, the signaling message analysis tool 138 locates the acknowledgement to the request dial tone message, the method proceeds to step 228 for further processing.

At step 228, the signaling message analysis tool 138 determines if the request dial tone message identified at step 222 was NACKED by a subsequent message from the endpoint. To do so, the selected protocol message the signaling message analysis tool 138 searches through the sorted protocol message file 140 for an entry indicating that the request dial tone message was NACKED. If the signaling message analysis tool 138 locates such an entry within the sorted protocol message file 140, the method proceeds to step 230 to begin generation of a warning message at step 230 in a manner to be more fully described below. If, however, the signaling message analysis tool 138 fails to locates such an entry, the proactive analysis tool proceeds to step 234 of FIG. 5c for further processing.

Returning momentarily to FIG. 5b, if the proactive analysis tool either determined at step 222 that an RQNT dial tone message was never received, determined at step 224 that the RQNT dial tone message was late in arriving, determined at step 226 that the RQNT dial tone message was never acknowledged or determined at step 228 that the RQNT dial tone message was NACKED by the endpoint, the method proceeds to step 230 to begin generation of a warning message for placement in the warning/error message file 144. More specifically, at step 230, the name of the customer having problems receiving a dial tone is retrieved from the customer information file 142. While the customer information file 142 may contain a wide variety of information regarding customers obtaining service from the service provider operating the access node 102-1 or 102-2, the customer information file 142 should, at a minimum contain a series of entries, each having the name of a customer as a first component thereof and an identifier of the IAD through which the customer receives service. As the messages reviewed by the signaling message analysis tool 138 will contain, as one component thereof, an identifier where the request for connection originated, by matching the identifier from the request for connection to the identifier for an entry in the customer information file 142, the name of the customer having problems properly obtaining dial tone.

After acquiring the name of the customer having problems properly obtaining dial tone, the method proceeds to step 232 where a warning message is constructed and output to the warning/error message file 144. The particular warning message will vary depending on the type of dial tone problem being experienced by the customer. More specifically, if the signaling message analysis tool 138 determines at either steps 222, 226 or 228 that that the customer failed to receive a dial tone, at step 232, the signaling message analysis tool 138 generates a "No Dial Tone" warning message from the entry in the customer information file 142 containing the customer's name, the NTFY message indicating an originating off-hook and, if available, the RQNT message containing the request for dial tone and/or the NACK of that RQNT. If, however, the signaling message analysis tool 138 determined at step 224 that the RQNT message containing the request for dial tone was late in arriving, the signaling message analysis tool 138 generates a "Delayed Dial Tone" warning message from the entry in the customer information file 142 containing the customer's name, the NTFY message indicating an originating off-hook information, the late arriving RQNT message containing a subsequent request for dial tone. After generating either a "No Dial Tone" or "Delayed Dial Tone" warning message at step 232, the signaling message analysis tool 138 places the generated warning in the warning/error message file 144.

Figure 5C:
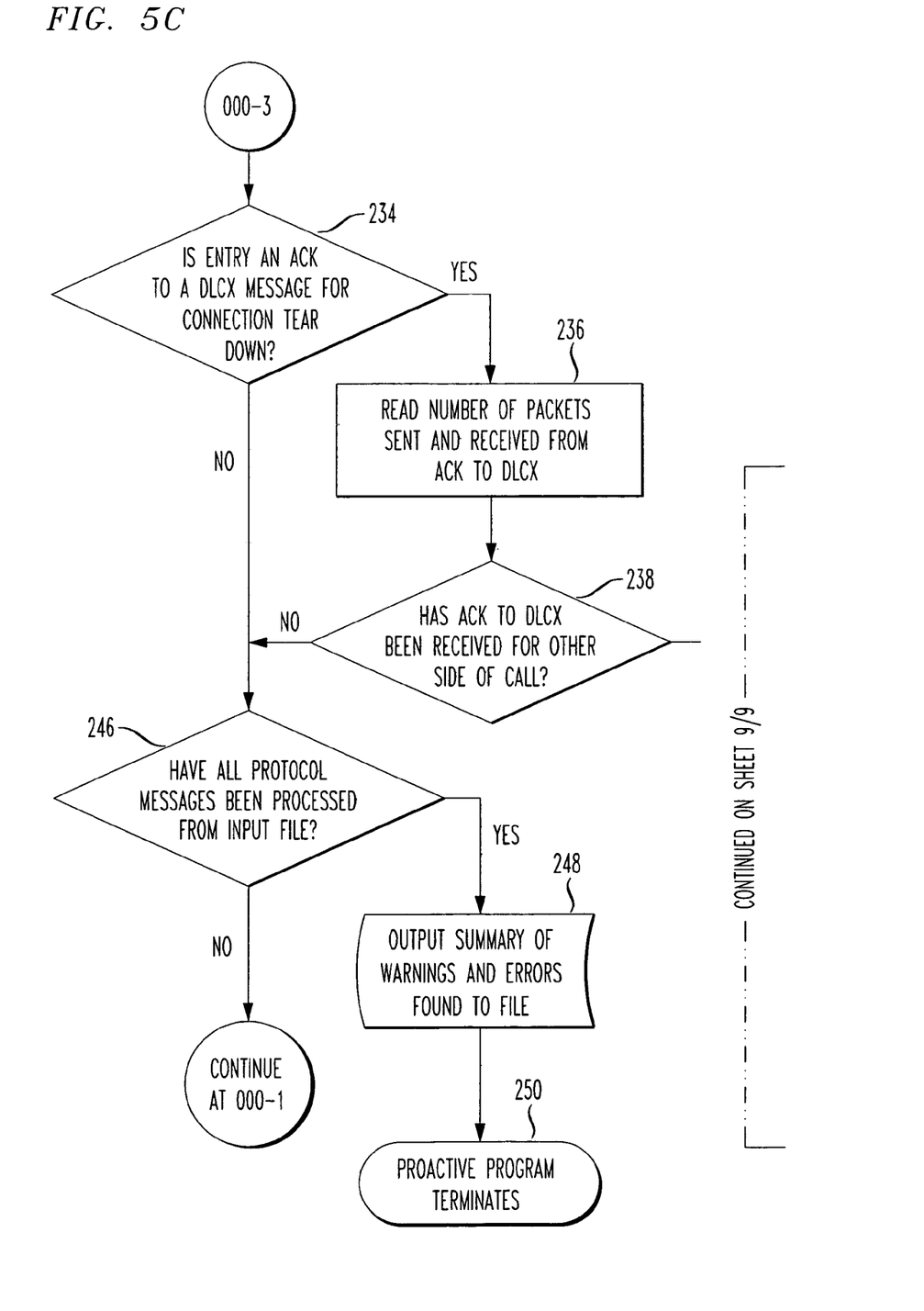

Returning now to step 234 for further processing, if the signaling message analysis tool 138 determines that the selected entry being examined is an ACK to a DLCX request for connection tear down, the method will proceed to step 236 where the signaling message analysis tool 138 reads the number of packets sent and received from the ACK to the DLCX request. The method then proceeds to step 238 where the signaling message analysis tool 138 searches the sorted protocol message file 140 for an ACK to the DLCX request for connection tear down from the other side of the connection. The ACK from the other side of the connection would be readily identified by the signaling message analysis tool 138 since the message would have the same call identifier as the ACK from the first side of the connection. If the signaling message analysis tool 138 locates the ACK from the second side of the connection, the method proceeds to step 240 where the signaling message analysis tool 138 compares the packets sent and received on the bearer path for both sides of the connection.

Continuing on to step 242, the signaling message analysis tool 138 determines if excessive packet loss has occurred during the connection To do so, the signaling message analysis tool 138 will determine a packet loss rate by comparing the number of packets received on one side of the call to the number of packets sent from the other side of the call. If the rate of packet loss is below a pre-selected threshold value, for example, 10%, the signaling message analysis tool 138 determines that the rate of packet loss is acceptable and the method returns to step 208 of FIG. 5a for selection and analysis of a next protocol message maintained in the sorted protocol message file 140 in the manner previously set forth. If, however, the signaling message analysis tool 138 determines at step 242 that the rate of packet loss exceeds the pre-selected threshold value, then the method instead proceeds to step 244 for generation of a "Bearer Path Loss" event message using information from the DLCX request for connection tear down and the ACK messages from respective sides of the connection. The method then returns to step 208 of FIG. 5a for selection and analysis of a next protocol message maintained in the sorted protocol messages file 130 in the manner previously described.

Returning momentarily to FIG. 5c, if the signaling message analysis tool 138 determines at step 234 that the selected protocol message being analyzed is not an ACK to a DLCX message for connection tear down or if the signaling message analysis tool 138 is unable to located an ACK to the DLCX message at step 238, the method proceeds to step 246 where the proactive analysis tool determines if all of the protocol messages in the protocol messages file 130 have been analyzed. If there are additional protocol messages to be processed, the method returns to step 208 of FIG. 5a for selection and analysis of a next protocol message maintained in the protocol message file 140 in the manner previously described. If, however, the signaling message analysis tool 138 determines at step 246 that all of the protocol messages in the sorted protocol message file 140 have been analyzed, the method proceeds to 248 where the signaling message analysis tool 138 generates a summary of the warnings and errors placed in the warnings/error messages file 144 for output. The summary may contain selected portion of each warning or error, for example, the type of warning or error and the location, within the sorted protocol message file 140, of the protocol message which caused the warning or error message.

Once constructed, the signaling message analysis tool 138 may Email or otherwise deliver the summary of warnings and errors to a service technician coupled to the proactive analysis system 120. For example, if the service technician operated the computer system on which the proactive analysis system 120 is installed, the proactive analysis tool may run in the background of the computer system and generated a pop-up notification containing the summary of warnings and error messages. Conversely, if the service technician operates a second computer system (not shown) coupled to the computer system on which the proactive analysis system 120 is installed via a network (also not shown), the signaling message analysis tool 138 may generate an Email containing the summary of warning and error messages for delivery to the second computer system. Upon receiving the notification containing the summary of warnings and error messages, the service technician can review the more detailed information contained in the warning/error message file 144 and, based upon an analysis of that file, proactively initiate corrective action for selected customers having service problems. For example, upon reviewing the warnings and error messages contained in the warnings/error message file 144, the service technician may identify any deficiencies in service which have occurred, access the cross-referenced entries in the sorted protocol message file 140 if additional information regarding the deficiencies in service is needed and initiate appropriate corrective action. If desired, the service technician may choose to contact subscribers affected by the service deficiencies, notify them of the detected problem as well as advise them of any planned corrective action. Having issued a summary of warnings and error messages to the service technician at step 248, the method ends at step 250 with termination of the proactive analysis program.

Thus, there has been described and illustrated herein, a method and apparatus for analyzing signaling messages to identifying deficiencies in telephone service provided to a customer such the service provider for the customer may proactively remedy the identified deficiencies without having to await a customer complaint regarding such deficiencies. However, those skilled in the art should recognize that numerous modifications and variations may be made in the techniques disclosed herein without departing substantially from the spirit and scope of the invention. Accordingly, the scope of the invention should only be defined by the claims appended hereto.

What is claimed is:

1. A telecommunications network, comprising:
   a. a switch for handling a VOIP call, said switch handling, in connection with said VOIP call, a series of signaling messages; and
   b. a monitoring system coupled to said switch, said monitoring system identifying service deficiencies by examining, in chronological order, said series of signaling messages handled by said switch in connection with said VOIP call; wherein said switch further comprises:
      i. a plurality of call processors, each handling selected ones of said series of signaling messages in connection with said VOIP call; and
      ii a plurality of signaling message files, each coupled to a corresponding one of said plurality of call processors, for maintaining said selected ones of said series of signaling messages handled by said corresponding call processor.

2. The telecommunications network of claim 1, wherein said monitoring system further comprises:
   a. a first software tool;
   b. a sorted signaling message file coupled to said first software tool, said first software tool merging said signaling messages maintained in each one of said plurality of signaling message files into said sorted signaling message file, said signaling messages from said plurality of signaling message files arranged, in said sorted signaling message file, in chronological order; and c. a second software tool coupled to said sorted signaling message file, said second software tool examining, in sequence, each one of said signaling messages maintained in said sorted signaling message file and determining, based upon one or more of said examined signaling messages, if a warning or error message should be generated.

3. The telecommunications network of claim 2, wherein said monitoring system further comprises a warning/error message file coupled to said second software tool, said second software tool constructing an warning or error message using information contained in said one or more examined signaling messages based upon which said second software tool determined that said warning or error message should be generated.

4. The telecommunications network of claim 2, and further comprising:
   a. a customer information file coupled to said second software tool; and
   b. a warning/error message file coupled to said second software tool,
   c. wherein said second software tool constructs warning or error messages using information contained in said one or more examined signaling messages based upon which said second software tool determined that said warning or error message should be generated and information in said customer information file related to an IAD customer.

5. The telecommunications network of claim 4, wherein said second software tool determines that a warning message should be generated upon determining that excessive time has elapsed between generation of a signaling message requiring an acknowledgement and receipt of that acknowledgement.

6. The telecommunications network of claim 4, wherein said second software tool determines that a warning message should be generated upon determining that excessive time has elapsed between a customer going off-hook and receiving dial tone.

7. The telecommunications network of claim 4, wherein said second software tool determines that a warning message should be generated upon determining that excessive packet loss has occurred during a VOIP connection.

8. A method for proactively monitoring signaling messages, comprising:
   a) establishing a data file having a plurality of entries, each entry in said database describing a customer served by a service provider;
   b) examining a set of signaling messages related to a VOIP call to identify a service deficiency for a customer;
   c) generating a warning message containing information regarding said identified service deficiency from said set of signaling messages and information from an entry in said data file describing said customer; and
   d) upon reviewing said generated warning message, said service provider initiating corrective action to proactively rectify said identified service deficiency for said customer.

9. The method of claim 8, and further comprising:
   a. acquiring, by a first call processor operated by said service provider, a first portion of said set of signaling messages related to VOIP call;
   b. acquiring, by a second call processor operated by said service provider, a second portion of said set of signaling messages related to said VOIP call;
   c. acquiring, by a third call processor operated by said service provider, a third portion of said set of signaling messages related to said VOIP call; and
   d. producing said set of set of signaling messages by merging said first and second portions of said set of signaling messages in a chronological order.

10. The method of claim 8, and further comprising the steps of:
    a. acquiring said set of signaling messages related to said VOIP call; and
    b. arranging said acquired set of signaling messages in a chronological order.

11. The method of claim 10, wherein said set of signaling messages are sequentially examined in said arranged chronological order.

12. The method of claim 11, wherein examining said set of signaling messages further comprises:
    a. identifying a first signaling message which requires a reply;
    b. subsequently identifying a second signaling message which contains said reply to said first control message; and
    c. determining if a time period separating the arrival of said first and second control messages is acceptable.

13. The method of claim 12, wherein said warning message is generated if said time period exceeds a pre-selected threshold value.

14. The method of claim 12, wherein said first signaling message requires an acknowledgement of receipt and said second signaling message contains said acknowledgement of receipt of said first signaling message.

15. The method of claim 12, wherein said first signaling message indicates that said customer has gone off-hook and said second signaling message indicates that tone has been requested for said customer.

16. The method of claim 11, wherein examining said set of signaling messages further comprises:
    a. identifying a first signaling message which contains bearer path data from said subscriber;
    b. subsequently identifying a second signaling message which contains bearer path data from said second subscriber; and
    c. determining packet loss between said first and second subscribers from said bearer path data contained in said first and second signaling messages.

17. The method of claim 16, wherein said warning message is generated if said packet loss exceeds a predetermined threshold value.

18. The method of claim 11, wherein examining said set of signaling messages further comprises:
    a. identifying a first signaling message which requires a reply, and
    b. generating said warning message if a signaling message which contains said reply to said first signaling message is not identified in said set of signaling messages.

19. The method of claim 18, wherein said first signaling message indicates that said customer has gone off-hook and said signaling message which contains said reply but which was not identified in said set of signaling messages would have indicated that said customer had received dial tone.

* * * * *